United States Patent [19]
> Bitterice et al.

[11] 4,078,107
[45] Mar. 7, 1978

[54] LIGHTWEIGHT WINDOW WITH HEATING CIRCUIT AND ANTI-STATIC CIRCUIT AND A METHOD FOR ITS PREPARATION

[75] Inventors: Michael G. Bitterice, New Kensington; Leroy D. Keslar, Natrona Heights, both of Pa.

[73] Assignee: PPG Industries, Inc., Pittsburgh, Pa.

[21] Appl. No.: 700,239

[22] Filed: Jun. 28, 1976

[51] Int. Cl.² ............... B64D 15/12; H05B 3/34; B32B 27/40; B32B 17/04
[52] U.S. Cl. ..................... 428/38; 156/99; 156/275; 219/203; 219/544; 244/134 D; 428/256; 428/379; 428/385; 428/412; 428/425; 428/463; 428/922
[58] Field of Search ............ 428/922, 38, 412, 425, 428/463, 256, 379, 385; 219/203, 345, 522, 544; 244/134 D; 156/99, 102, 275

[56] References Cited
U.S. PATENT DOCUMENTS

| | | | |
|---|---|---|---|
| 2,526,327 | 10/1950 | Carlson | 219/544 |
| 2,599,059 | 6/1952 | Jones | 244/134 D |
| 3,310,458 | 3/1967 | Mattimoe et al. | 428/451 |
| 3,440,408 | 4/1969 | Brittan | 219/203 X |
| 3,458,388 | 7/1969 | Moynihan | 428/412 X |
| 3,657,057 | 4/1972 | Shorr et al. | 428/412 |
| 3,752,348 | 8/1973 | Dickason et al. | 219/203 |
| 3,801,418 | 4/1974 | Cornelis et al. | 428/922 X |
| 3,974,359 | 8/1976 | Orcutt et al. | 219/203 |

*Primary Examiner*—Harold Ansher
*Attorney, Agent, or Firm*—Edward I. Mates

[57] ABSTRACT

A transparent plastic window containing embedded therein a novel static electricity dissipating circuit (hereinafter referred to as an anti-static circuit), which may also contain a heating circuit insulated therefrom, and a method of producing such windows.

12 Claims, 15 Drawing Figures

LIGHTWEIGHT WINDOW WITH HEATING CIRCUIT AND ANTI-STATIC CIRCUIT AND A METHOD FOR ITS PREPARATION

BACKGROUND OF THE INVENTION

1. Field of the Invention

This invention relates to transparent heated windows having an outer surface of hard plastic suitable for use in lightweight aircraft. In the past, laminated windows for aircraft have been provided with internally located heating circuits that are energized to remove fog, mist or ice that deposits on the outer surface of the window in flight and electroconductive anti-static coatings on the outer surface connected to ground to dissipate any change of static electricity that develops during operation of an airplane before the static charge is dissipated through the heating circuit by forcing an electrical path through the window thickness from the outer surface where the static charge develops to the heating circuit.

One type of such window is composed of laminated glass comprising alternate plies of rigid transparent dielectric material, such as glass or a well known substitute for glass such as polycarbonates, acrylic plastics, polyester resins and certain hard polyurethanes, with plies of relatively flexible interlayer material, such a plasticized polyvinyl butyral and polyurethanes, bonding the plies of rigid dielectric material together to form a laminated window. In laminated glass windows, the anti-static coatings are usually continuous transparent metal or metal oxide coatings of low or moderate electroconductivity bonded to the outer glass sheet of the window. Laminated windows containing one or more glass sheets or other dielectric material layers in lieu of glass are provided with a transparent electroconductive heating circuit.

In one type of heated laminated window, the heating circuit is carried by the relatively flexible plastic interlayer sheet laminated between rigid transparent dielectric plies to form an electrically powerable transparent laminated window. The electroconductive heating circuit of this type is either in the form of a transparent film carried on a carrier film embedded within an interlayer or a series of wires embedded directly within the interlayer. Transparent electroconductive heating circuits and heating circuits composed of wire have also been applied on the inner surface of outer plies of rigid transparent dielectric materials such as glass facing an adjacent interlayer. Heating circuits containing electroconductive wire as the heating element either embedded in the flexible interlayer or adjacent to an interlayer surface could conduct only a limited amount of current before optical distortion resulted from a steep thermal gradient between the heating wire and the space between adjacent wires. Therefore, wire embedded heating circuits of the prior art had limited usefulness in aircraft windows.

In light planes where weight of windows is important, it is preferred to substitute, in place of glass, dielectric materials having less density than glass, such as plastics, for example, acrylics and polycarbonates, as the relatively rigid transparent dielectric layers of the laminated window. However, transparent electroconductive coatings of metal or metal oxide materials of suitable electroconductivity consistent with optical transparency require relatively high temperatures for their application to a substrate. Therefore, while it is suitable to apply such coatings on glass substrates by pyrolysis of metal salt compositions at high temperatures or by cathode sputtering, which is also accomplished at elevated temperatures slightly less than those required for pyrolysis, the high substrate temperatures required for pyrolysis or cathode sputtering make it impossible to obtain satisfactory transparent electroconductive coatings on plastic substrates such as acrylics and polycarbonates without degrading the composition of the plastic substrate during the application of the transparent electroconductive film. Furthermore, when the film is applied at a temperature below which the plastic substrate tends to deteriorate, the film that forms has insufficient electroconductivity to provide the heat needed for the purposes intended.

When an electroconductive heating circuit is applied to the inner major surface of the outer layer of a laminated window in the absence of a so-called anti-static circuit on the outward facing surface thereof, the circuit provides a portion of an electrical path for grounding a discharge of static electricity that develops on the outer surface of the window when the latter is installed in a plane in flight. Since the current path of the discharge is through the thickness of the outer layer, a current discharge causes a hole through said entire thickness of the outer layer, thus weakening the latter and eventually causing the panel to fail in service.

In order to avoid damage to laminated windows resulting from the discharge of static electricity through the thickness of the outer layer, transparent electroconductive films produced by pyrolysis have been coated onto the outwardly facing surface of the outer glass layer of the laminated aircraft windows containing an outer glass layer. While films of suitable durability and electroconductivity can be formed on the outer surface of glass sheets to enable the latter to dissipate static electricity before it discharges through the heating circuit for a reasonable period of service, the requirements for a low temperature of application onto a plastic surface has made it difficult, if not impossible, to obtain films of sufficient durability to serve anti-static circuits when the latter are applied to the outwardly facing surface of an outer layer of a laminated aircraft window when the outer layer is composed of a plastic, such as acrylic plastic or polycarbonate.

Prior to the present invention, none of the alternate transparent electroconductive coatings available for use as anti-static coatings on plastic layers could provide the necessary combination of optical transparency, electroconductivity and durability in service for even a single flight. Accordingly, attempts were made to develop a coating of sufficient durability to last for a single flight so that each time a plane landed, the anti-static coating could be replenished. However, the latter solution is not desirable because it requires additional operations each time a plane lands and, furthermore, no suitable anti-static coatings has been developed which can be applied to a plastic substrate at temperatures normally encountered at airports.

2. Description of the Prior Art

From the foregoing, it is obvious that there is a need to overcome the several disadvantages of the laminated aircraft windows so a to provide a durable static electricity dissipating circuit on the outer surface of the window, a heating circuit that does not develop poor optical properties, and suitable bonding between adjacent layers of the laminated window. Also, a convenient method of producing a laminated window with these improved characteristics is needed.

U.S. Pat. No. 2,813,960 to Egle et al shows a laminated heated window in which heating wires are sewn or embedded in an organic interlayer material such as cellulose derivatives, polyvinyl, polyamides or silicones or in ceramic materials as well as glass so that these materials can be generally used for area heating either in transparent or opaque bodies. The heating element is completely embedded in the insulating heated body material.

Other patents that use metal filaments or wire to carry electric current in an electroconductive transparent panel include U.S. Pat. Nos. 2,526,327 to Carlson; 2,932,710 to Coale et al; 3,484,583 and 3,484,584 to Shaw; 3,729,616; 3,795,472; 3,745,309 and 3,895,433 to Gruss; 3,414,713 to Reifeiss; 3,409,759 to Boicey et al; 3,233,829 to Davy et al; and 3,888,711 to Breitner. These latter references are directed to glass-plastic laminates in which electroconductive wires are embedded within the interlayer of the laminate so that the heating wires are supported within the plastic interlayer material.

Other laminated heated glass windows having electroconductive elements applied as transparent coatings to an inner surface of an outer glass sheet are found in many patents. U.S. Pat. No. 3,261,739 to Porter is typical.

In lightweight airplanes, the mass of laminated window units is an important factor. Hence, it would be desirable to obtain heated windows using materials lighter than glass.

U.S. Pat. No. 3,310,458 to Mattimoe and Hofmann discloses a laminate containing an outer ply of a stretched acrylic resin, a vinyl butyral resin interlayer, and another layer of plastic having a continuous electroconductive film facing the interlayer. The electroconductive film is applied to the plastic layer other than the outer ply because of the difficulty of applying a continuous electroconductive film on stretched acrylic without harming its resistance to crack propagation. Such a unit subject to destruction due to the build-up of static electricity on its exterior surface, which periodically discharges through the film applied to the other plastic layer. If a surface coating is applied to the outer surface of an outer acrylic sheet at a substrate temperature below that which would cause substrate damage, it must be applied by vacuum evaporation. However, such coatings are not permanent and their anti-static properties are soon lost as the coating wears out.

Other heated laminated windows for aircraft used prior to the present invention found in many patents, of which U.S. Pat. No. 3,816,201 to Armstrong and Hoover is typical, comprise a pair of glass sheets laminated together by a composite interlayer consisting essentially of a carrier layer of polyethylene terephthalate polyester ("MYLAR") containing a gold electroconductive coating on one surface thereof and adhered by layers of polyvinyl butyral to outer sheets of glass. This type of system has several disadvantages. The laminated unit has a tendency to delaminate at the surface between each interlayer and the gold film and also between the interlayer and the carrier layer. Furthermore, it is necessary to use in these units bus bar materials, which cure at low temperature and which are not very durable, in combination with the gold film that forms an electroconductive component of the heating circuit.

U.S. Pat. No. 2,470,509 to Marini discloses the application of a pair of heating wires disposed near the opposite surfaces of an interlayer disposed between two glass sheets. The interlayer is press polished before it is laminated to the glass sheets and the heating wires are disposed at or near the interface of a relatively rigid transparent sheet of glass and a relatively flexible of interlayer material.

U.S. Pat. No. 3,629,040 to Hinton et al discloses a method of applying heating wires and feed conductors or bus bars directly to the surface of a glass sheet, using an adhesive to maintain the wires in position and subsequently applying electric current to burn off the adhesive. A soldering iron is used to apply the bus bars to the heating wires.

SUMMARY OF THE INVENTION

A embodiment of this invention comprises a composite transparency or window comprising an outer ply of relatively hard transparent acrylic plastic having a first circuit comprising relatively widely spaced wires embedded adjacent the outer major surface thereof and a second circuit comprising relatively closely spaced wires embedded adjacent the inner major surface thereof and an inner layer of hard transparent plastic selected from the class consisting of polycarbonates and acrylic plastics fused to said other major surface of said outer ply. Terminal means are connected to the first circuit and adapted for connection to a ground to enable the first circuit to dissipate electrical charge that develops on the outer surface of the window before the charge increases to the point where it discharges at high voltage through the second circuit and damages the window, so that the first circuit behaves as an anti-static circuit when grounded. Additional terminal means adapted for connection to a voltage source is connected to the second circuit to enable the second circuit to operate as a heating circuit when so connected.

The inner layer of hard transparent plastic fused to the outer acrylic layer of the window insures that the second circuit is embedded in relatively hard transparent plastic in spaced relation to any exposed surfaces of a hard plastic layer. Thus, when the window is of the laminated variety containing one or more layers of flexible interlayer material bonding the inner layer to one or more additional layers of rigid dielectric material, the inner layer of rigid transparent plastic separates the wires of the heating circuit from close adjacency to the relatively soft interlayer material. This separation of the heating circuit from the relatively soft interlayer material enables the laminated window to have acceptable optical properties at significantly higher power densities resulting from voltage applied to the heating circuit compared to power densities that cause optical distortion when applied to heating circuits embedded in or adjacent the relatively soft interlayer.

The present invention provides a lightweight aircraft window having a heating circuit capable of being heated for defogging and defrosting purposes and also provided with means to avoid degradation of the panel resulting from an accumulation of static electricity on the outer surface of the panel resulting in static discharge through the heating circuit that damages the panel and may even destroy the latter.

The present invention also provides heated plastic windows of suitable lightweight material to be used with lightweight aircraft that incoporate therein a heating circuit providing good optical properties even when subjected to higher power densities that damage plastic windows provided with transparent electroconductive coatings or with heating wire circuits disposed within a relatively low softening point interlayer material that also incorporate means in the form of an anti-static electroconductive wire circuit connected to an electrode that is suitably grounded so as to dissipate any static electricity before the latter develops to the point where the window may be damaged by static discharge.

The present invention also provides a method of fabricating transparent windows having relatively widely spaced wires embedded adjacent the outer surface of an outer layer of acrylic plastic and adapted to be grounded to dissipate a static electricity charge and insulated from relatively closely spaced embedded wires serving as an element of a heating circuit, which involves applying the embedded wire to a rigid transparent dielectric layer other than the relatively soft interlayer and fabricating the laminated window in such a manner that in the laminated window that results, the wires of the heating circuit lie in sufficiently spaced relation to an interfacial surface with the relatively soft interlayer to minimize optical distortion of the laminated window in use.

According to one embodiment of the method of the present invention, bus bar elements are applied and wires are sewn into the opposite surfaces of a relatively rigid layer of acrylic plastic and the rigid layer is press polished according to a cycle of steps to embed the wires in grooves formed by sewing, to contact the wires with the bus bar elements and to provide smooth surfaces and a thin film in the hard acrylic sheet to cover the wires and to help promote good optical properties in the laminated window. The bus bars are connected to lead lines.

The wire sewn into one surface of said rigid layer is composed of widely separated runs, whereas the wire sewn into the other surface is composed of closely spaced runs. The first layer of rigid transparent plastic is then assembled against a second layer of rigid transparent plastic free of embedded wire with the surface containing the closely spaced wires oriented to face the second layer. In such relationship, the press polished sheet is then fused by heat and pressure to the second layer of hard plastic to embed the heating circuit within the thickness of a composite layer of hard transparent plastic that results from pressure fusing the layers.

In order to insure adequate electrode connection between the closely spaced wires and its associated bus bars, the bus bars applied to the surface containing the closely spaced wires are composed of two layers, one of which is embedded prior to sewing the closely spaced wires into the substrate and the second layer of bus bars is applied after the heating wire is installed. The bus bars of both surfaces extend across the wires near the ends of their elongated runs so as to make good electrical contact therewith.

Sewing is accomplished with minimum pressure necessary to embed the wires. Sewing produces grooves in the surface of the plastic. Sewing with minimum pressure reduces the depth of the grooves formed by sewing. The wires are embedded and the grooves are smoothed by applying a moderate pressure while raising the temperature and, when the maximum temperature of the press polishing cycle is attained, the plastic with the wires in the grooves is subjected to pressure to embed the wires and bus bars within the smooth optical surface that results.

The composite layer can also be produced by an alternate method which comprises applying wire having widely spaced runs and its associated bus bar arrangement to a surface portion of one layer, applying wire having closely spaced runs and its associated bus bar arrangement to a surface portion of a second layer, assembling the one layer with its surface free of wire facing the wire embedded surface of the second layer and fusing the layers together while so assembled to form a composite layer. The composite layer formed is suitable for use either as a window or as a transparency applied to the outer surface of a portion of a window when produced by either of the alternate methods described.

If the resulting composite layer is to be laminated using typical interlayer material to bond the composite layer to one or more rigid transparent layers, the final lamination is accomplished at a slightly lower temperature than the temperature used during the press polishing steps that smooth the surfaces and embed the wire and bus bars in the rigid transparent plastic composite layer. The wires, bus bars and lead wires of the anti-static circuit are spaced from those of the heating circuit for insulation purposes, thus allowing independent operation.

The present invention will be better understood in the light of a description of a specific embodiment that follows.

BRIEF DESCRIPTION OF THE DRAWINGS

In the drawings which form part of a description of an illustrative embodiment of the present invention, and wherein like reference numbers refer to like structural elements.

DESCRIPTION OF THE PREFERRED EMBODIMENT

The drawings depict a preferred embodiment of the invention and the various stages in a preferred fabrication method to fabricate said preferred embodiment. The latter comprises an outer layer 20 of acrylic plastic sheet, preferably polymethyl methacrylate sold under the trademark PLEXIGLAS II by Rohm and Haas Company and conforming to Military Specification MIL-P-5425C. The outer layer 20 has opposed press polished surfaces 24 and 32 and is fused to a second layer 50 of a rigid transparent material, such as a polycarbonate resin or a second sheet of acrylic plastic, which may be a second sheet of polymethyl methacrylate conforming to MIL-P-5425C or of a slightly higher cross-linked polymethyl methacrylate conforming to MIL-P-8184B sold under the trademark PLEXIGLAS 55 or polycarbonate. If the second layer is polycarbonate, it is preferably of the type described in U.S. Pat. No. 3,388,032 to Saunders that is preferably prepared by reacting di-(monohydroxyaryl)-alkanes with derivatives of carbonic acid such as phosgene and bischlorocarbonic acid esters of di-(monohydroxylaryl)-alkanes.

The layers 20 and 50 form a composite layer that can provide either a window or a transparency to be applied to the outer surface of a portion of an installed window of an airplane.

The outer layer 20 of the window has an outer surface 32 that is press polished and contains wire 30 sewn in the form of widely spaced, reversely connected elongated runs, the end portions at one side thereof being connected to an intermediate portion 37 of wire mesh 36 that is turned at right angles to form end portions 38. The latter are connected to lead wires 39 which, in turn, are adapted for grounding connections to the frame of an aircraft in which the window or transparency is installed. The outer layer 20 has an inner surface 24 fused to a major surface 52 of the second hard plastic layer 50. The latter is provided with opposite press polished surfaces 52 and 54. Along the inner surface 24 are fused, reversely connected elongated runs of closely spaced wire 40, some of which runs have end portions 42 sandwiched between an inner strip 22 of tinned copper and an outer strip 34 of tinned copper superimposed in aligned relation over the inner strip 22 to form a pair of composite bus bars 22, 34 extending parallel to the end portions 38 of mesh 36. Lead wires 44 are attached to corresponding ends of the composite bus bars 22, 34 and extend from the same side edge of the window as lead wires 39 in spaced relation thereto so that the anti-static circuit comprising wire 30 is insulated from the heating circuit comprising wire 40.

The other major surface 54 of the second hard plastic layer 50 is also press polished and forms the outer surface of a composite layer that forms a plastic window having an outer layer of plastic 20 having widely separated wires 30 of an anti-static circuit embedded near its outer exposed press polished surface 32 and closely spaced wires 40 of a heating circuit embedded adjacent its press polished surface 24 fused to the press polished surface 52 of the second layer of rigid transparent plastic 50 with the second press polished surface 54 forming the exposed inner surface of the window. Such an embodiment is illustrated in FIG. 12.

Figure 12:
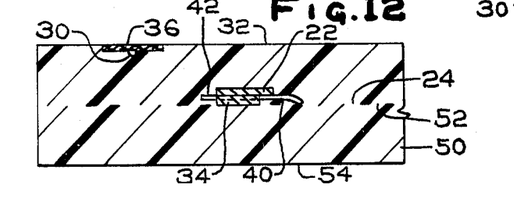
FIG. 12 is a view similar to FIG. 10 showing how the two acrylic layers that are fused together as depicted in FIG. 11 appear as an internal composite layer after they are fused together.

The composite layer of plastic of FIG. 12 may be further laminated to a layer 60 of interlayer material such as plasticized polyvinyl butyral or polyurethane for adhering the composite layer 20, 50 to a portion of an outer surface of an aircraft windshield. A preferable plasticized polyvinyl butyral resin prepared as disclosed in U.S. Pat. No. 2,400,957, although other polyvinyl acetal resins made from saturated or unsubstituted aliphatic aldehydes may be used. These would include polyvinyl acetal resins made from unsubstituted saturated aliphatic aldehydes containing less than six carbon atoms and especially those made from formaldehyde, acetaldehyde, butyraldehyde and mixtures thereof. Particularly preferred are polyvinyl acetal resins made from butyraldehyde, the so-called polyvinyl butyral, preferably having a molecular weight ranging from 150,000 to 250,000. More details on the preparation of polyvinyl acetal resins are found in U.S. Pat. Nos. Re. 20,430 and 2,496,480.

Conventionally, such polyvinyl acetal interlayers contain a plasticizer, generally of a water-insoluble ester of a polybasic acid and a polyhydric alcohol. Particularly desirable plasticizers for use in the present invention are triethylene glycol (di(2-ethyl butyrate), dibutyl sebacate, di(beta-butoxy-ethyl) sebacate and dioctyl phthalate. Various plasticizers for polyvinyl acetal resins are described in detail in U.S. Pat. No. 2,526,728 to Burk et al and in U.S. Pat. No. 2,372,522.

Polyurethanes are generally useful for interlayer material for interlayer 60. A wide range of polyurethane compositions are useful, particularly polyester urethanes disclosed in the patent literature. For example, U.S. Pat. No. 3,931,113 to Seeger and Kaman discloses a family of polyester polyurethane compositions having superior properties for use in safety glass windshields that are formed from an hydroxy-terminated polyester of polycaprolactone or polybutylene adipate or polybutylene azelate or mixtures and a diol having a molecular weight less than 250, preferably 1,4-butanediol or 1,3-butanediol and a cycloaliphatic isocyanate.

Figures 13, 14, 15:
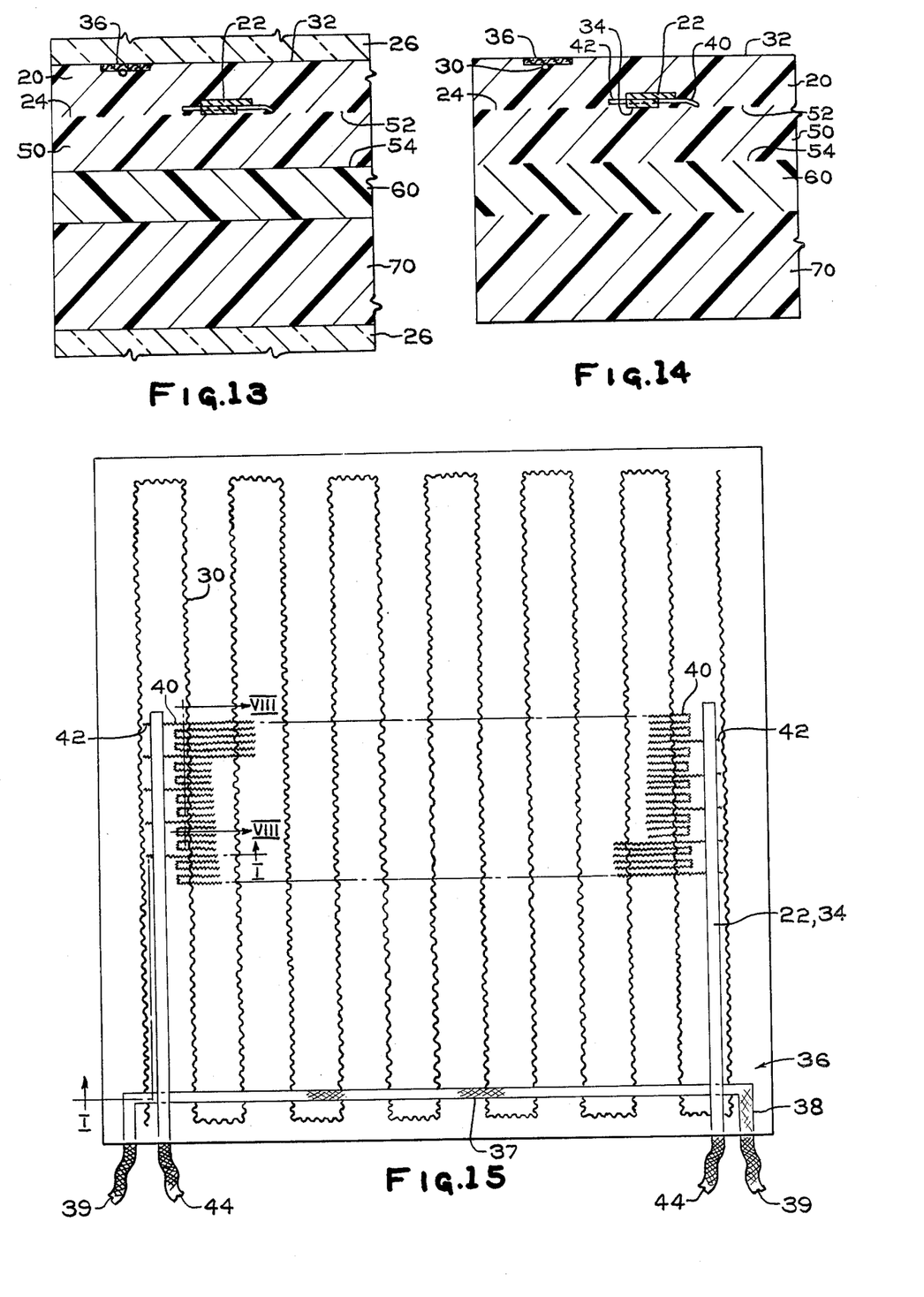
FIG. 13 is a fragmentary view similar to FIG. 11 showing how the subassembly of FIG. 12 is assembled with a layer of interlayer material and another layer of rigid transparent material and interposed between a pair of press polishing molds (only a fragment thereof being shown) for further lamination.
FIG. 14 is a fragmentary sectional view of a laminated window along the lines I—I of FIG. 15 resulting from the final lamination of the elements of the assembly as depicted in FIG. 13 and after the laminated assembly is removed from between the press polishing members.
FIG. 15 is a plan view of a window depicted either in FIG. 12 or FIG 14 and provided with a heating circuit formed from the closely spaced wires and their associated two element bus bars and an anti-static circuit formed from the widely spaced wires and their associated wire mesh bus bars according to the principles of the present invention.

FIG. 14 shows a laminated window comprising a fused composite plastic layer comprising an outer layer 20 of acrylic plastic supporting wires embedded therein at different levels thereof and an inner layer 50 of either acrylic plastic or polycarbonate plastic laminated through a layer 60 of interlayer material in spaced relation to the wires embedded in the outer layer 20 to an inner layer 70 of a rigid transparent material such a glass or polycarbonate or acrylic plastic. It is also understood that the inner layer 70 may be omitted in the final window, and also that additional alternate layers of interlayer material and rigid transparent material may be included in the final window.

It is also understood that various devices for attaching the laminated window to an aircraft body well known in the art may be incorporated. Typical attachment mechanisms are disclosed in U.S. Pat. No. 3,919,022 to Stefanik.

The following procedure represents an optimum method used to fabricate heated plastic windows for lightweight aircraft just described. In the first step, depicted in FIG. 1, a layer of acrylic plastic 20, preferably polymethyl methacrylate conforming to Military Specification MIL-P-5425C, which is available commercially as PLEXIGLAS II, is mounted in a horizontal position and a strip 22 of tinned copper is applied against a first surface 24 of the acrylic plastic 20. The layer of acrylic plastic 20 is then press polished between a pair of press polishing molds of tempered glass 26 with a suitable parting material 28 on the glass surfaces facing the acrylic plastic sheet. The press polishing is performed at a preferred temperature of 300° to 315° F. (149° to 157° C.) and a pressure of 200 pounds per square inch (13.6 atmospheres) for 60 to 90 minutes.

Figures 1, 2, 3:
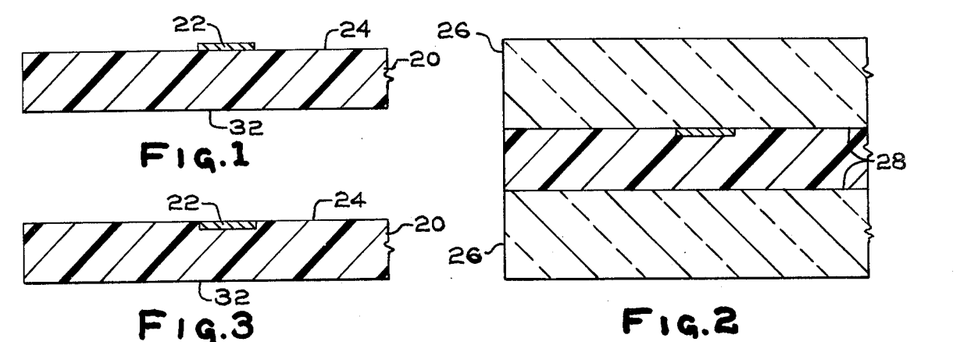
FIG. 1 is a fragmentary cross-sectional view taken along the lines I—I of FIG. 15 of a corner portion of an assembly of a layer of acrylic plastic which forms the outer layer of a window conforming to this invention with one element of a compound bus bar applied against a surface thereof preparatory to a first press polishing step.
FIG. 2 is a fragmentary sectional view of the assembly portion of FIG. 1, showing a pair of press polishing molds pressing said first bus bar element into the surface of the acrylic plastic layer.
FIG. 3 is a view similar to FIG. 1 showing the outer layer of the window to be formed containing one element of the heating circuit bus bar embedded in a press polished surface of the acrylic plastic layer after the method step depicted in FIG. 2 is completed.

FIG. 2 shows the assembly as it is being press polished to embed one layer of the tinned copper bus bar 22 into the surface 24 of the acrylic plastic sheet 20. FIG. 3 shows how the bus bar layer 22 is embedded into the surface 24 of the acrylic sheet 20 as a result of the press polishing operation of FIG. 2. A typical bus bar layer 22 is an elongated strip 5/16 inch (8 millimeters) wide, 2.5 mils (0.064 millimeters) thick and the acrylic plastic layer has a thickness between 60 and 125 mils (1.5 and 3.1 millimeters). The bus bar layer 22 is positioned by applying a coating of an adhesive such as polyurethane dissolved in a suitable solvent (e.g., methyl ethyl ketone, chloroform, etc.) and tacking the lower bus bar layer 22 with a soldering iron to spaced points along surface 24.

The parting material 28 applied to glass press polishing molds 26 is preferably of a material that adheres to glass and separates readily from acrylic plastic and, preferably, also one that is readily separable from polycarbonate plastic. A good parting material that has been successfully used is a coating of dimethyl dichlorosilane or the residue when dimethyl dichlorosilane is contacted with water such as moisture in the atmosphere. However, other well known parting materials may be substituted.

Wire for an anti-static circuit element is then sewn into surface 32 of the acrylic plastic sheet 20 which is opposite the first surface 24. In a typical anti-static circuit, molybdenum-tungsten alloy wire having a diameter of 1.5 mil (0.04 millimeters) is applied in reversely arranged runs spaced 2 to 4 inches (5 to 10 centimeters) apart and a wire mesh screen 36 is applied against the sewn wire in the plastic layer 20 near the corresponding ends of the runs of the wire 30. This sewing forms widely spaced, narrow grooves in the surface 32 having a preferred maximum depth of 5 mils (0.13 millimeter). The wires 30 are destined to become elements of an anti-static circuit in the finished laminated window.

Additional wire 40 destined to become a heating element of a heating circuit in the finished windshield and which is similar to the wires of the anti-static circuit except that the heating circuit wires are provided in reversely arranged runs spaced from one another closer together than the runs of wire 30, preferably approximately 30 mils (0.76 millimeter) apart, is then applied to the surface 24. This application is a form of sewing using a hot needle that forms a groove in the surface and is similar to the wire sewing of the anti-static circuit element. The depth of the grooves for the runs of wire 40 is approximately the same as that for the runs of wire 30.

The runs of wire 40 extend along sinusoidal elongated lines that extend transverse to the length of the strips of first bus bar layers 22. The end portions 42 of certain periodic runs of heating wire 40 extend beyond the first layer of tinned copper 22. A second layer 34 of tinned copper, also in the form of an elongated strip like layer 22 is superimposed over each of the first layers 22 and tacked into position thereover with a soldering iron. Strips 22 and 34 form composite bus bars 22, 34 making electric connections with the end portions 42 of certain runs of heating wire 40 disposed therebetween. Lead wires 44 are connected to the corresponding ends of the composite bus bars 22, 34 and are adapted for connection to a voltage source.

An elongated wire mesh 36 is disposed with its intermediate portion 37 extending transverse to the length of bus bars 22, 34 and terminal portions 38 extending from the ends of intermediate portion 37 in approximately parallel relation to the ends of composite bus bars 22, 34. Lead wires 39 are connected to the terminal portions 38 and, when the window is installed in an airplane, are coupled to the airplane frame to provide connections to ground. The intermediate portion 37 of the elongated wire mesh 36 extends parallel to the elongated runs of the wire 40 for the heating circuit and intersects the runs of the wire 30 for the anti-static circuit to provide an electrical connection between the runs of wire 30 and ground through portions 37 and 38 of wire mesh 36, lead wires 39 and the airplane frame. However, there is no electrical connection between the wire 30 for the anti-static circuit and the wire 40 for the heating circuit, because the respective wires are applied to opposite major surfaces of the outer ply 20 and their respective leads are spaced from each other.

Figure 5:
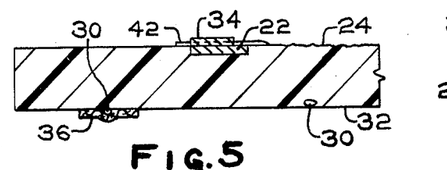
FIG. 5 is a view similar to FIG. 4 showing how a second bus bar element is applied over the first bus bar element to sandwich an end portion of the runs of the closely spaced wires therebetween.

The assembly as depicted in FIG. 5 is then arranged between a pair of tempered glass plates 26 which serve as press polishing molds with a release coating 28 similar to the one depicted in FIG. 2 facing the opposite surfaces of the acrylic layer 20 containing the closely spaced runs of the heating wire 40 embedded in grooves on its first surface 24 thereof and the composite bus bar 22, 34 applied to said surface 24, while the relatively widely spaced anti-static wire 30 is embedded in the second surface 32 thereof and the mesh 36 is applied to said second surface 32.

Figure 6:
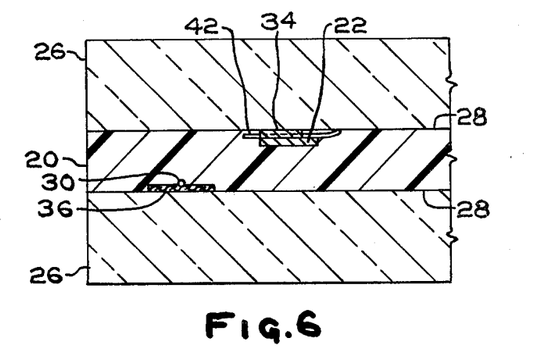
FIG. 6 is a fragmentary cross-sectional view similar to FIG. 2 showing how the assembly of FIG. 5 is press polished between a pair of opposed polishing molds.
Figure 9:
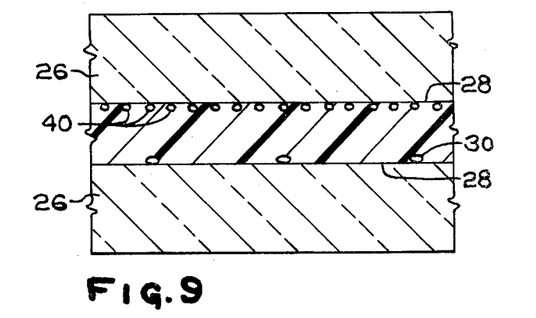
FIG. 9 is a fragmentary view at right angles to that of FIG. 6 showing how the acrylic sheet with the wires contained in the grooves formed in the opposite surfaces is supported between a pair of press polishing molds.
Figure 10:
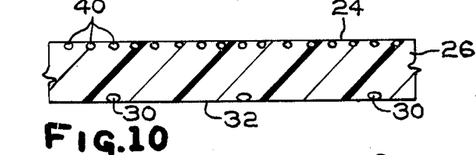
FIG. 10 is a view similar to FIG. 8 showing how the opposite wires become embedded within the grooves in which they are deposited during the sewing operation and how the grooved surfaces become smooth during the press polishing step depicted in FIGS. 6 and 9.

The assembly of glass and acrylic plastic sheets assembled as depicted in FIG. 6 is inserted in a laminating bag, preferably of the type depicted in U.s. Pat. No. 3,255,567 of Keslar and Rankin. The laminating bag (not shown) is formed of two plies including an outer ply of polyethylene glycol terephthalate, commercially known as Mylar, and an inner ply of polyethylene bound thereto. The inner ply of polyethylene is embossed along its inner surfaces to form a checkerboard pattern of rounded proturberances to permit the escape of air. The assembly, arranged as shown in FIGS. 6 and 9, is inserted within the bag, the bag is evacuated and sealed and the assembly subjected to the following autoclave cycle. First, the assembly is heated to a temperature of 300° F. (149° C.) while maintaining a pressure of 20 to 25 pounds per square inch (1.4 to 1.7 atmospheres) and held at this temperature and pressure for 15 minutes. The pressure is then increased to 200 pounds per square inch (13.6 atmospheres) and the temperature raised to 325° F. (163° C.) and held for 90 minutes. The temperature is reduced to 100° F. (38° C.), the pressure is lowered to atmospheric pressure, the bag is opened and the assembly inspected.

Figure 4:
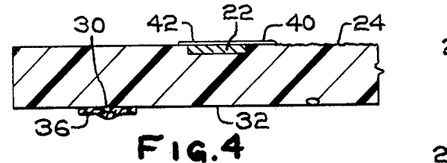
FIG. 4 is a view similar to FIGS. 1 and 3 showing how the outer layer looks after closely spaced runs of wire are embedded in grooves in one surface of the acrylic layer with end portions of certain runs extending beyond said one bus bar element, widely spaced runs of wire are embedded in the other surface of the acrylic layer, and a wire mesh type bus bar applied across an end portion of the widely spaced runs.
Figure 7:
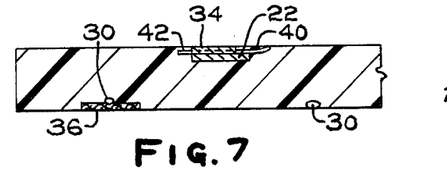
FIG. 7 is a view similar to FIG. 5 showing how the respective bus bars and the wires are embedded within the opposite surfaces of the acrylic layer in the press polishing step of FIG. 6.
Figure 8:
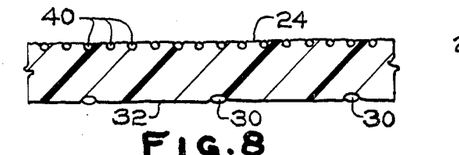
FIG. 8 is a fragmentary sectional view taken along the lines VIII—VIII of FIG. 15 (generally at right angles to the view of FIG. 5) showing how the wires applied to the opposite surfaces of the acrylic sheet are deposited in grooves formed in the opposite surfaces of the acrylic layer.

FIGS. 7, 8 and 9 are fragmentary views taken at right angles to the views of FIGS. 4, 5 and 6 showing how the acrylic plastic layer 20 is arranged with the wires 30 and 40 embedded in the opposite surfaces 24 and 32. The inspection of the assembly reveals the surfaces 24 and 32 press polished, with wires 30 and 40, mesh 36 and the first bus bar layer 22 embedded in the opposite surfaces and second layer 34 of the composite bus bar exposed.

Figure 11:
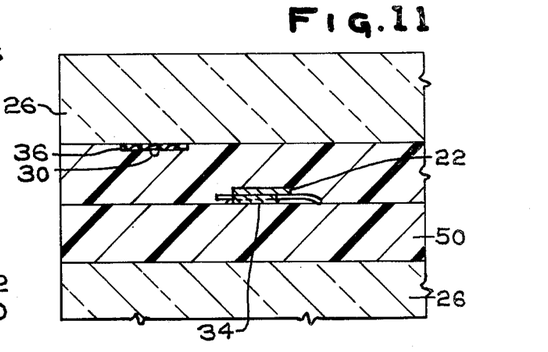
FIG. 11 is a fragmentary schematic view showing how the press polished acrylic layer of FIG. 10 is assembled with an additional layer of hard plastic between a pair of press polishing molds for a fusion operation to form a composite layer.

The second layer of tinned copper 34 which was previously tacked in position to the first bus bar layer 22 is removed and permanently attached to the first bus bar layer 22 by soldering. After the press polishing of layer 20 is completed, and afer the heating circuit bus bar elements 22 and 34 are completely soldered to one another, the press polished acrylic plastic layer 20 is mounted in such a position that its surface 32 faces a glass mold 26 and its surface 24 faces a second layer 50 of plastic which may be a second sheet of acrylic plastic or a polycarbonate sheet. The assembly of said plastic layers, one of which is the acrylic plastic sheet 20 which has had its anti-static wire 30 and heating wire 40 plus the bus bars embedded in the opposite surfaces thereof, is then assembled between a pair of press polishing molds 26 having suitable parting material 28 as in the previously disclosed tempered glass molds and the subassembly so formed depicted in FIG. 11 is autoclaved at a temperature of 315° to 325° F. (157° to 163° C.) and a pressure of 200 pounds per square inch (13.6 atmospheres) for 60 to 90 minutes. This fuses the two plastic layers 20 and 50 together to form a composite plastic layer depicted in FIG. 12.

While not shown, the composite plastic layer of FIG. 12 may be fabricated by applying wire 30 and mesh 36 to surface 32 of layer 20 and wire 40 and composite bus bar 22, 34 to surface 52 of layer 50, press polishing layers 20 and 50 separately after their respective treatments and assembling layers 20 against layer 50 with surface 24 facing surface 52 for the fusion pressing step depicted in FIG. 11. For all practical purposes, the composite plastic layer 20, 50 that results from either method of fabrication is suitable for use as a window or as a transparency to be applied to a portion of a surface of an aircraft window.

The composite plastic layer containing layer 20 and layer 50 fused together is then assembled with a layer 60 of plastic interlayer material such as polyurethane or plasticized polyvinyl butyral and an additional sheet of transparent material 70 assembled against the opposite surface of the layer 60, if further lamination is desired. The sheet 70 may be of glass as well as polycarbonate or acrylic. The end portions 38 of the elongated wire mesh 36 serve as a bus bar for the anti-static wires 30 and may be soldered to ground leads 39 either before or after the final lamination. The final lamination is usually conducted at a temperature of 275° to 300° F. (135° to 149° C.) and at a pressure of 200 pounds per square inch (13.6 atmospheres) for 60 to 90 minutes. In all the laminating and press polishing operations, the assembly is inserted within a bag of the type depicted in the aforesaid Keslar and Rankin patent as in the first press polishing step.

Laminated windows produced by the method just described were tested in comparison with laminated assemblies that have heating wires embedded in an outer acrylic layer 20 in close adjacency to the interlayer 60. The composite structures depicted in FIGS. 14 and 15 were able to withstand much higher power applied than the previous laminates having the heating wires embedded at or near the interfacial surface between the interlayer 60 and the outer acrylic sheet 20. The optics of the heated sheets were improved when the heating wires were separated from the plastic interlayer by the thickness of the second plastic layer 50 (of either acrylic or polycarbonate) compared to when the heating wires were located at or near the interfacial surface between the layer 50 and a polyurethane interlayer 60.

A preferred embodiment of this invention consists of an outer layer of PLEXIGLAS II (polymethyl methacrylate conforming to Military Specification MIL-P-5425) 60 mils (1.5 millimeter) thick fused to an inner layer of PLEXIGLAS 55 (polymethyl methacrylate sheet conforming to Military Specification MIL-P-8184) also 60 mils (1.5 millimeter) thick, an interlayer of polyurethane 125 mils (3.1 millimeters) thick and an inner layer of polycarbonate 0.125 inch (3.1 millimeters) thick. The embedded wires for both the heating and the anti-static circuits were of molybdenum-tungsten wire 1.5 mil (0.038 millimeter) thick with its reversely connected runs spaced 2 inches (5 centimeters) apart from run to run in the anti-static circuit and 30 mils (0.76 millimeter) apart in the heating circuit. The bus bar for the anti-static circuit was a wire mesh 0.0055 inch (0.14 millimeter) thick, approximately ¼ inch (6.35 millimeters) wide and the bus bars for the heating circuit were composed of two layers of 2.5 mil (0.064 millimeter) thick tinned copper approximately ¼ to ⅜ inch (6.35 to 9.52 millimeters) wide superimposed on one another against opposite surfaces of the embedded wire runs forming the heating circuit.

The present invention has been tested and compared with prior art heated windows of various types. When compared with laminated windows using gold films carried on Mylar and laminated to outer plies of rigid transparent material, the present structure has been found superior.

Gold films with adequate transparency have an upper limit of electroconductivity such that their surface resistivity is limited to less than 40 ohms per square. The gold film, in order to develop a lesser electrical resistivity, must be made so thick that its optical properties are impaired, as is its ability to adhere to the carrier film on which it is deposited. Hence, this type of heated laminated window imposes severe design limitations compared to the capabilities of the present invention. Therefore, a heating circuit containing thin elongated wires embedded in plastic has proven to be an extremely reliable system for laminated transparencies and can be designed to a much lower electrical resistance compared to that with which gold films applied to carrier films sandwiched between layers of interlayer material are practical to use.

Heating wire circuits used in the interlayers at or near the glass-plastic interfaces of laminated glass transparencies have acceptable optics when the heating circuits are used in power densities as high as 3.5 watts per square inch (2.26 kilowatts per square meter). However, when heating wire is sewn in a thermoplastic interlayer such as the plasticized polyvinyl butyral normally used in laminated heating units whose outer layers are composed of acrylic or polycarbonate plastics, power densities of as little as 1.5 to 2 watts per square inch (1 to 1.3 kilowatts per square meter) cause the optical properties to degenerate to the point where they become unacceptable. This power density is not adequate for deicing requirements which require power density of 4.5 watts per square inch (3 kilowatts per square meter) in certain cases. The present invention has determined that separating the wire of the heating circuit from the interlayer material improves the resistance of the laminated window to optical distortion when the heating circuit is energized.

When a heating circuit embedded in a polyvinyl butyral interlayer is heated for defogging and deicing purposes, the heated area in the vicinity of the heating wires become fuzzy. This fuzziness is believed to be due to the thermal gradient that is created in the interlayer between the adjacent hot wires. Since the thermoplastic interlayers are very poor thermal conductors, the interlayer becomes very hot near the wires and a steep thermal gradient develops in the interlayer to a minimum temperature at the mid-point between adjacent wires when the heating wire is energized. This thermal gradient is believed to cause a gradient in index of refraction within the interlayer which gives an appearance of fuzziness.

Plastic laminates containing hard rigid transparent sheets of either acrylic plastic or polycarbonate laminated with layers of interlayer material having electroconductive heating wires embedded therein provide even worse optical properties than corresponding laminates of the aforesaid thermoplastic interlayer materials to glass. The reason for this deterioration of optical properties is believed to be because glass is a better thermal conductor (approximately four times better) than either acrylic or polycarbonate plastic. Consequently, the thermal gradient and index of refraction gradient are more severe in the laminated plastic windows than in the laminated glass windows. However, the interposition of a second rigid plastic layer 50 between the heating wire 40 and the plastic interlayer 60 provides a structure that reduces the tendency for optical distortion to result at given power densities. A minimum thickness of at least half the wire spacing for the second layer is usually sufficient to improve the optical properties of the laminated window, because such a layer separates the spaced heating wire 40 from the relatively soft interlayer by a sufficiently thick layer of relatively hard plastic to enable the laminated transparency or window so formed to have the heat radiated or conducted from adjacent runs of heating wire blend to a more uniform heat pattern when the heat radiation reaches the soft interlayer.

Having a heating circuit embedded within the thickness of a fused outer composite layer of relatively rigid transparent plastic also would provide a circuit for discharge of static electricity through the thickness of the rigid plastic with consequent damage and even destruction to the rigid transparent plastic. Since the continuous anti-static coatings applicable to glass are not sufficiently durable for plastic surfaces, the use of a wire circuit embedded within and adjacent the outer surface of the window or transparency provides a charge dissipating circuit that inhibits the development of a high voltage charge that tends to discharge through the thickness of the outer layer and the wire of the heating circuit.

While the specific embodiments just described comprise both a heating circuit element and a static electricity dissipation (or "anti-static") circuit element, both comprising electroconductive wire embedded in rigid transparent plastic, the term "rigid" signifying a material significantly less flexible than conventional interlayer material used to bond relatively rigid layers together, and rigid materials are exemplified by polycarbonate and acrylic plastics recited herein, we believe that the present invention also provides a novel static dissipation circuit comprising electroconductive wire embedded adjacent an exposed surface of a hard plastic transparency or window, preferably at a depth no greater than 5 mils (0.13 millimeter) and adapted for connection to ground with or without a heating circuit.

In the claims that follow, the term "terminal means" is used to refer to the composite bus bars 22, 34 of the heating circuit and the wire mesh 36 of the static electricity discharge (or anti-static) circuit.

The form of the invention described herein is a preferred embodiment of the present invention and certain modifications thereof. For example, other bus bar materials may be substituted for the mesh 36, such as conductive metal strips, other heating wire such as tungsten or other metal wire may be substituted, and the outer layer 20 having the wire 30 of the anti-static circuit embedded therein may be composed of any suitable rigid transparent plastic, such as polycarbonate resin, or even a rigid hard transparent polyurethane composition, the interlayer 60 may be composed of any other flexible interlayer material such as silicone resins and composites of layers of the same or dissimilar flexible interlayer materials and many other changes may be made in the method described such as eliminating the press polishing step of FIGS. 6 and 9 in order to reduce the possibility of breaking wire during the fabrication of the composite transparency of FIG. 12. It is understood, however, that other changes may be made without departing from the gist of the present invention as recited in the claimed subject matter that follows.

We claim:

1. A composite transparency comprising an outer layer of rigid transparent plastic selected from the class consisting of polycarbonate and acrylic plastic having a first circuit element comprising relatively widely spaced wire runs embedded adjacent one major surface thereof, an inner layer of hard transparent plastic selected from the class consisting of polycarbonate and acrylic plastic fused to the other opposite major surface of said outer layer and a second circuit element comprising relatively closely spaced wire runs embedded adjacent the fused surfaces of said layers in spaced relation to said first circuit element in the direction of the thickness of said transparency, terminal means connected to said first circuit and adapted for connection to a ground to enable said first circuit to operate as an anti-static circuit when so connected, additional terminal means connected to said second circuit and adapted for connection to a voltage source to enable said second circuit to operate as a heating circuit when so connected.

2. A composite transparency as in claim 1, wherein said closely spaced wire runs are embedded within said outer layer.

3. A composite transparency as in claim 1, wherein said closely spaced wire runs are embedded within said inner layer.

4. A transparent window comprising the transparency as in claim 1, further including a third layer of hard transparent material selected from the class consisting of polycarbonate, acrylic plastic and glass laminated to said inner layer, and a layer of plastic interlayer material selected from the class consisting of polyvinyl acetal and polyurethane interposed between said inner layer and said third layer.

5. A transparent panel as in claim 4, wherein said closely spaced wire runs are embedded within the thickness of said composite transparency at a minimum distance of half the wire spacing from said layer of plastic interlayer material.

6. A composite transparency as in claim 1, wherein said terminal means connected to said second circuit element comprises a pair of electroconductive, elongated, aligned metal strips disposed adjacent opposite sides of the area occupied by said wire runs of said second circuit element and in electrical contact with the end portions of a sufficient number of said wire runs of said second circuit element adjacent to the opposite ends of said wires of said second circuit element to provide a heating circuit when said second circuit is energized.

7. A composite transparency as in claim 1, wherein said terminal means connected to said first circuit element comprises an elongated electroconductive metal screen contacting a sufficient number of the wire runs of said first circuit element to provide a lead adapted for connection to ground to enable said first circuit to serve to dissipate static electricity that accumulates on said one major surface during service.

8. A transparency as in claim 7, wherein said wire runs of said first circuit are embedded within said layer at a maximum depth of 5 mils (0.13 millimeter).

9. A composite transparency as in claim 1, wherein said outer layer is composed of polymethyl methacrylate.

10. A transparency comprising a layer of rigid transparent plastic taken from the class consisting of acrylic resins and polycarbonates having a first major surface adapted for exposure to the atmosphere and a circuit element comprising a plurality of wire runs embedded within and covered by said layer in closely spaced relation to said first major surface at a maximum depth of 5 mils (0.13 millimeter) and terminal means connected to said wire and adapted for connection to ground to enable said circuit element to comprise part of a static charge dissipation circuit when connected as adapted for connection.

11. A transparency as in claim 10, further including a heating circuit carried thereby in spaced relation to said wire runs measured through the thickness of said transparency.

12. A transparency as in claim 11, further including a layer of plastic interlayer material selected from the class consisting of polyvinyl acetal and polyurethane bonded to said transparency and a layer of rigid transparent material selected from the class consisting of polycarbonate, acrylic plastic and glass bonded to said interlayer material, said heating circuit being carried by one of said rigid transparent plastic layers.

* * * * *

UNITED STATES PATENT AND TRADEMARK OFFICE
CERTIFICATE OF CORRECTION

PATENT NO. : 4,078,107
DATED : March 7, 1978
INVENTOR(S) : Michael G. Bitterice & Leroy D. Keslar It is certified that error appears in the above-identified patent and that said Letters Patent are hereby corrected as shown below:

Column 1, line 16, "change" should be --charge--.

Column 1, line 26, "a" should be --as--.

Column 1, line 49, after "adjacent" please insert --flexible--.

Column 2, line 62, "a" should be --as--.

Column 3, line 40, after "unit" please insert --is--.

Column 4, line 1, "wo" should be --two--.

Column 4, line 5, after "flexible" please insert --sheet--.

Column 4, line 16, "A" should be --An--.

Column 9, line 4, "polyrurethane" should be --polyurethane--.

Column 9, line 22, "a" should be --as--.

Column 11, line 10, "U.s." should be --U.S.--.

Column 11, line 68, "layers" should be -- layer --.

Signed and Sealed this

Twentieth Day of June 1978

[SEAL]

Attest:

RUTH C. MASON
*Attesting Officer*

DONALD W. BANNER
*Commissioner of Patents and Trademarks*